(12) United States Patent
Du Pontavice et al.

(10) Patent No.: US 11,608,153 B2
(45) Date of Patent: Mar. 21, 2023

(54) STRATOSPHERIC LIFT SYSTEM WITH PARTIAL BALLONET

(71) Applicant: THALES, Courbevoie (FR)

(72) Inventors: Emmanuel Du Pontavice, Cannes (FR); Louis Glaenzer, Cannes (FR)

(73) Assignee: THALES, Courbevoie (FR)

( * ) Notice: Subject to any disclaimer, the term of this patent is extended or adjusted under 35 U.S.C. 154(b) by 77 days.

(21) Appl. No.: 17/214,829

(22) Filed: Mar. 27, 2021

(65) Prior Publication Data

US 2021/0316835 A1 Oct. 14, 2021

(30) Foreign Application Priority Data

Apr. 9, 2020 (FR) ........................ 2003569

(51) Int. Cl.
*B64B 1/62* (2006.01)
(52) U.S. Cl.
CPC ...................... *B64B 1/62* (2013.01)
(58) Field of Classification Search
CPC ...................................................... B64B 1/62
See application file for complete search history.

(56) References Cited

U.S. PATENT DOCUMENTS

| 7,469,857 | B2 | 12/2008 | Voss | |
|---|---|---|---|---|
| 2001/0002686 | A1* | 6/2001 | Yokomaku | B64B 1/60 244/30 |
| 2006/0000945 | A1* | 1/2006 | Voss | B64B 1/60 244/97 |
| 2009/0114768 | A1* | 5/2009 | Voorhees | B64B 1/58 244/97 |

FOREIGN PATENT DOCUMENTS

| CN | 104 590 540 A | 5/2015 |
|---|---|---|
| DE | 696 253 C | 9/1940 |

* cited by examiner

*Primary Examiner* — Tye William Abell
(74) *Attorney, Agent, or Firm* — BakerHostetler

(57) ABSTRACT

A variable lift device includes a pressurized airtight enclosure accommodating air, a first airtight ballonet disposed inside the airtight enclosure accommodating a pressurized gas with a density lower than the density of air, the first airtight ballonet comprising a perforation means for perforating the first airtight ballonet.

14 Claims, 4 Drawing Sheets

STRATOSPHERIC LIFT SYSTEM WITH PARTIAL BALLONET

CROSS-REFERENCE TO RELATED APPLICATIONS

This application claims priority to foreign French patent application No. FR 2003569, filed on Apr. 9, 2020, the disclosure of which is incorporated by reference in its entirety.

FIELD OF THE INVENTION

The present invention relates to the field of variable lift devices using a gas lighter than air to rise into the atmosphere. More specifically, the invention deals with the lift and ascending flight phase strategies of variable lift devices provided with one tank for storing pressurized air and another tank for storing a pressurized gas lighter than air, such as helium, neon, methane, ethane and hydrogen. Hereinbelow, the gas with a density lower than the density of air will be called lift gas.

BACKGROUND

A variable lift device can be interpreted as a stratospheric dirigible platform with a pressurized flexible jacket, known as a "blimp".

Traditionally, during take-off phases, the variable lift device is filled mostly with air, the lift gas is separated from the air and represents less than 20% of the volume. In ascending phase, the air is discharged and the lift gas expands to fill all of the volume of the variable lift device.

Currently, this ascending phase can be negotiated in three ways:

The deflated lift technique which offers a variable lift device containing only, on take-off, the lift gas. Because of the absence of the air tank, the total weight of the variable lift device greatly decreases. This method is particularly appreciated in the field of meteorology. Nevertheless, the deflated lift method is unsuitable for variable lift devices including equipment on the jacket such as engines or solar generators which require a relatively rigid support onto which the systems are fixed.

The air ballonet method which offers a variable lift device provided with a main jacket intended to contain the lift gas and an airtight ballonet, contained inside the main jacket, intended to contain air. During the ascending phase, the airtight ballonet is emptied of the air that it contains to the outside environment and the lift gas expands, thus taking up the volume freed up by the airtight ballonet. However, the air ballonet method is a relatively heavy method since the variable lift device has to contain two tanks. In addition, this method presents certain risks such as, for example, a risk of pollution of the lift gas by the air in case of a leak in the airtight ballonet or even a risk of disturbing manoeuvrability with the presence of the empty airtight ballonet unsecured in the main jacket.

The lift gas ballonet method which offers a variable lift device provided with a main jacket intended to contain air and an airtight ballonet, contained inside the main jacket, intended to contain the lift gas. Nevertheless, variable lift device layout problems have arisen and some risks can be stated such as the risk of a leak associated with possible damage to the airtight ballonet. Although this method is appreciated in the aeronautical field, it remains, like the air ballonet method, a relatively heavy method.

SUMMARY OF THE INVENTION

The invention aims to mitigate all or some of the problems cited above by proposing a variable lift device comprising a main jacket intended to contain air and one or two airtight ballonets, contained in the main jacket, intended to contain a lift gas. In the case where two airtight ballonets are used, they are fluidically linked to one another in order to allow for an exchange of lift gas.

To this end, the subject of the invention is a variable lift device, characterized in that it comprises:

a pressurized airtight enclosure accommodating air, a first airtight ballonet disposed inside the airtight enclosure accommodating a pressurized gas with a density lower than the density of air, the first airtight ballonet comprising a perforation means for perforating the first airtight ballonet.

According to one aspect of the invention, the variable lift device comprises a second airtight ballonet disposed inside the airtight enclosure and fluidically connected to the first airtight ballonet.

According to one aspect of the invention, the airtight enclosure comprises a bow and the first airtight ballonet is disposed against an inner face of the bow of the airtight enclosure.

According to one aspect of the invention, the airtight enclosure comprises a top surface and the second airtight ballonet is disposed against the top surface of the airtight enclosure.

According to one aspect of the invention, the airtight enclosure comprises a stern and at least one discharge valve is disposed against the stern of the airtight enclosure.

According to one aspect of the invention, the first airtight ballonet is produced from a plastic material.

According to one aspect of the invention, the airtight enclosure comprises a retraction device for the first airtight ballonet and the retraction device for the first airtight ballonet comprises a winder in direct contact with the inner face of the bow of the airtight enclosure, the retraction device for the first airtight ballonet comprises a wired link of which one end e1 is in contact with the winder, and a second end e2 is in contact with the first airtight ballonet.

According to one aspect of the invention, the variable lift device extends along a first longitudinal axis A1 and comprises an additional inclination device disposed against the variable lift device.

According to one aspect of the invention, the additional inclination device has a transverse mobility along the longitudinal axis A1 from a position of balance P1 to a retracted position P2.

According to one aspect of the invention, the perforation means for perforating the first airtight ballonet is actuated using a controller.

According to one aspect of the invention, the first airtight ballonet is interchangeable.

BRIEF DESCRIPTION OF THE DRAWINGS

The invention will be better understood and other advantages will emerge on reading the detailed description of an embodiment given by way of example, the description being illustrated by the attached drawing in which.

In the interests of clarity, the same elements will bear the same references in the different figures.

DETAILED DESCRIPTION

In the present description, the term "lift gas" represents any gas with a density lower than the density of air. As an example, it can be helium, neon, methane, ethane or hydrogen.

In the present description, the term "bow" can be interpreted as the nose or the front face of the variable lift device. Conversely, the term "stern" denotes the tail or the rear face of the variable lift device.

Figure 1:
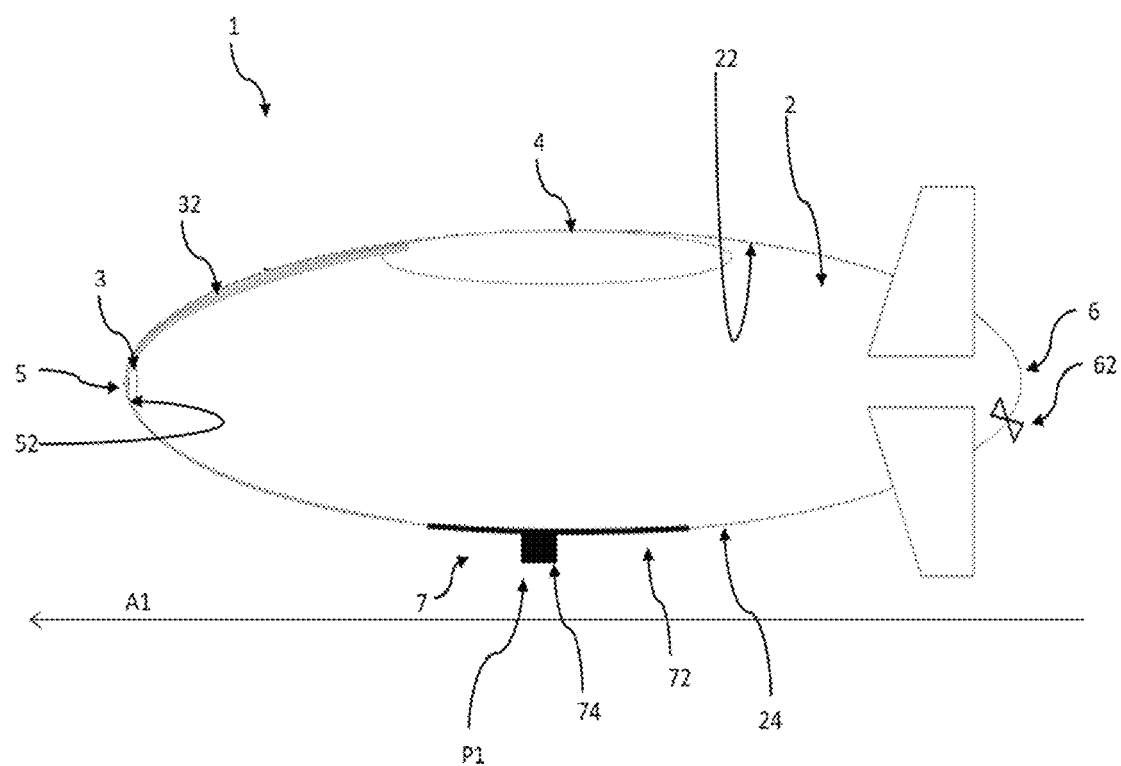
FIG. 1 represents a schematic view of the variable lift device according to the invention.

FIG. 1 represents a schematic view of an embodiment of the variable lift device 1 according to the invention. In the aeronautical field, the weight, directly linked to the overall mass of the variable lift devices, is one of the forces that the aviators have to fight. That is all the more the case for the ascending phases of a variable lift device.

The variable lift device 1 according to the invention is composed of an airtight jacket 2. This airtight enclosure 2 is totally filled with air. Furthermore, the airtight enclosure 2 comprises a first airtight ballonet 3 and a second airtight ballonet 4 disposed inside the airtight enclosure 2 accommodating a pressurized lift gas. The first airtight ballonet 3 is disposed against an inner face 52 of the bow 5 of the airtight enclosure 2. In fact, the variable lift device 1 comprises a bow 5 which can be defined as the forward section in the direction of flow of the air stream, i.e. parallel to a longitudinal axis A1 of the variable lift device and a stern 6 which can be defined as the part opposite the pulling direction or, in other words, the rear part considered in the direction of the flow of the air stream parallel to the longitudinal axis A1. The first airtight ballonet 3 is therefore disposed against the inner face 52 of the bow 5 and inside the airtight enclosure 2. The second airtight ballonet 4 is disposed against a top surface 22 of the airtight enclosure 2.

The second airtight ballonet 4, disposed inside the airtight enclosure 2, is fluidically connected to the first airtight ballonet 3. Indeed, a junction 32 ensures the fluidic connection between the first airtight ballonet 3 and the second airtight ballonet 4. In this way, the lift gas contained in the second airtight ballonet 4 can pass through to the first airtight ballonet 3 by this junction 32.

The first airtight ballonet 3 and the second airtight ballonet 4 each have a volume of compressed lift gas which, in the stratospheric pressure and temperature conditions, will allow a volume slightly greater than the volume of the airtight enclosure 2 to be filled.

Furthermore, at least one discharge valve 62 is disposed at the stern 6. This discharge valve 62 allows the air contained inside the airtight enclosure 2 to be expelled to the environment outside the variable lift device 1.

Finally, in an advantageous embodiment, the variable lift device 1 can comprise an additional inclination device 7 disposed against the variable lift device 1. More specifically, the additional inclination device 7 is placed against a bottom surface 24 of the airtight enclosure 2 outside the variable lift device 1. This additional inclination device 7 comprises a displacement rail 72 fixed against the bottom surface 24 of the airtight enclosure 2 and extending along the longitudinal axis A1 and an inclination mass 74 that can be displaced along the displacement rail 72. The inclination mass 74 therefore has a freedom of movement along the longitudinal axis A1. Thus, via this freedom of movement along the longitudinal axis A1, the additional inclination device 7 allows the trim angle of the variable lift device 1, that is to say the angle between the horizontal plane and the longitudinal axis A1 of the variable lift device 1, to be controlled.

Thus, when there is no need to influence the trim angle of the variable lift device 1, the additional inclination device 7 is in a position of balance P1, as represented in FIG. 1. In this position of balance P1, the overall centre of mass of the variable lift device 1 is centred and keeps the variable lift device 1 in the horizontal plane.

During the phase preceding the take-off of the variable lift device 1, only the second airtight ballonet 4 is filled with the compressed volume of lift gas. The first airtight ballonet 3 is therefore partially empty. Indeed, that allows the variable lift device 1 to be stabilized horizontally on the ground.

Figure 2:
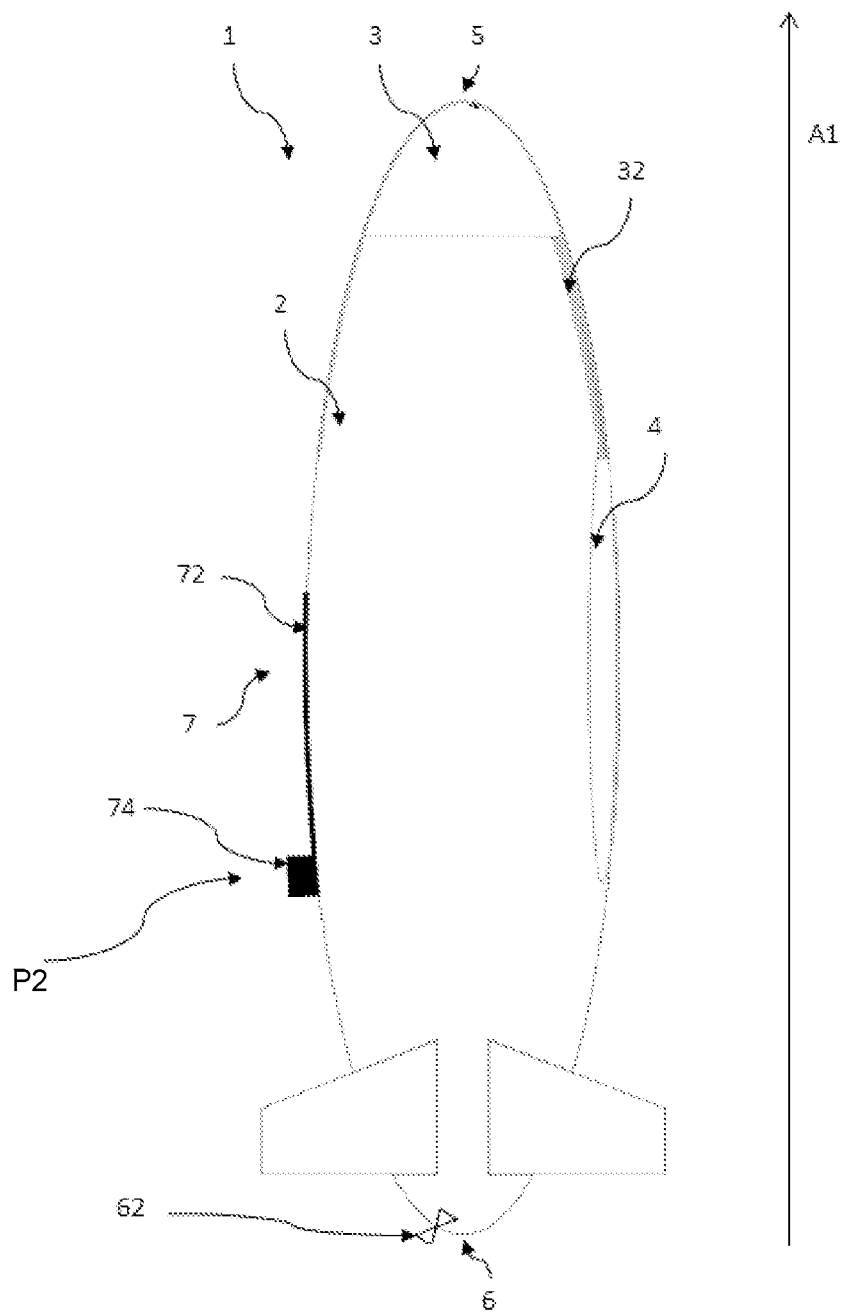
FIG. 2 represents a schematic view of the variable lift device according to the invention at the beginning of an ascending phase.

When the take-off takes place and ascension begins, the variable lift device 1 is placed vertically, as represented in FIG. 2. By a tilting of the centre of mass of the variable lift device 1 towards a more retracted position with respect to the centre of the volume of the variable lift device 1, and therefore by the creation of download of the variable lift device 1 by switching from a so-called horizontal position, as represented in FIG. 1, to a vertical position as represented in FIG. 2. In vertical position, the bow 5 then points in a direction of ascension which is the direction of rise of the variable lift device 1, whereas the stern 6 points in the opposite direction, that is to say towards the ground. Furthermore, the longitudinal axis A1 also undergoes a clockwise rotation in order to be parallel and in the same direction as the direction of ascension.

Furthermore, in order to facilitate the procedure for placing the variable lift device 1 in vertical position, the additional inclination device 7 then switches from a position of balance to a retracted position. In fact, the additional inclination device 7 has, as stated previously, a transverse mobility along the longitudinal axis A1. Thus, the inclination mass 74 slides on the displacement rail 72 in order to allow the additional inclination device 7 to switch from the position of balance P1 to a retracted position P2 represented in FIG. 2. This retracted position P2 influences the overall centre of mass of the variable lift device 1 by modifying its position. In fact, the centre of mass moves back along the transverse axis A1 towards the stern 6 which facilitates the vertical positioning of the variable lift device 1. In fact, the lift gas, contained in the second airtight ballonet 4, passes through the junction 32 in order to be positioned in the first airtight ballonet 3. From the take-off of the variable lift device 1, the second airtight ballonet 4 contains increasingly less lift gas to the benefit of the first airtight ballonet 3. In addition, the lift gas, once contained in the first airtight ballonet 3, expands because of the rise in altitude of the lift device 1 and increases the volume of the first airtight ballonet 3. The first airtight ballonet 3 is produced from a deformable material such as a type of plastic or other elastomer. More specifically, the wall of the first airtight ballonet 3 is produced in a plastic material.

The increase in the volume of the first airtight ballonet 3 means a reduction of the volume of air contained inside the airtight enclosure 2. Now, in order to maintain a controlled overpressure level inside the variable lift device 1, the discharge valve 62 expels the air. Moreover, this expulsion of the air contained in the airtight enclosure 2 induces a reduction of the weight of the air in the airtight enclosure 2, which allows the variable lift device 1 to rise, via the buoyancy.

That is then reflected by a progressive ascending phase of the variable lift device 1.

Thus, as the variable lift device 1 ascends, the lift gas contained in the first airtight ballonet 3 expands, which induces an increase in the volume of the first airtight ballonet 3. Now, in order to maintain a constant volume of the airtight enclosure 2, the volume of air contained in the airtight enclosure 2 therefore has to decrease. Thus, the discharge valve 62 expels continually, and throughout the ascending phase of the variable lift device 1, the air contained in the airtight enclosure 2.

In that way, the volume of air contained in the airtight enclosure 2 decreases to the benefit of the volume of the first airtight ballonet 3.

Figure 3:
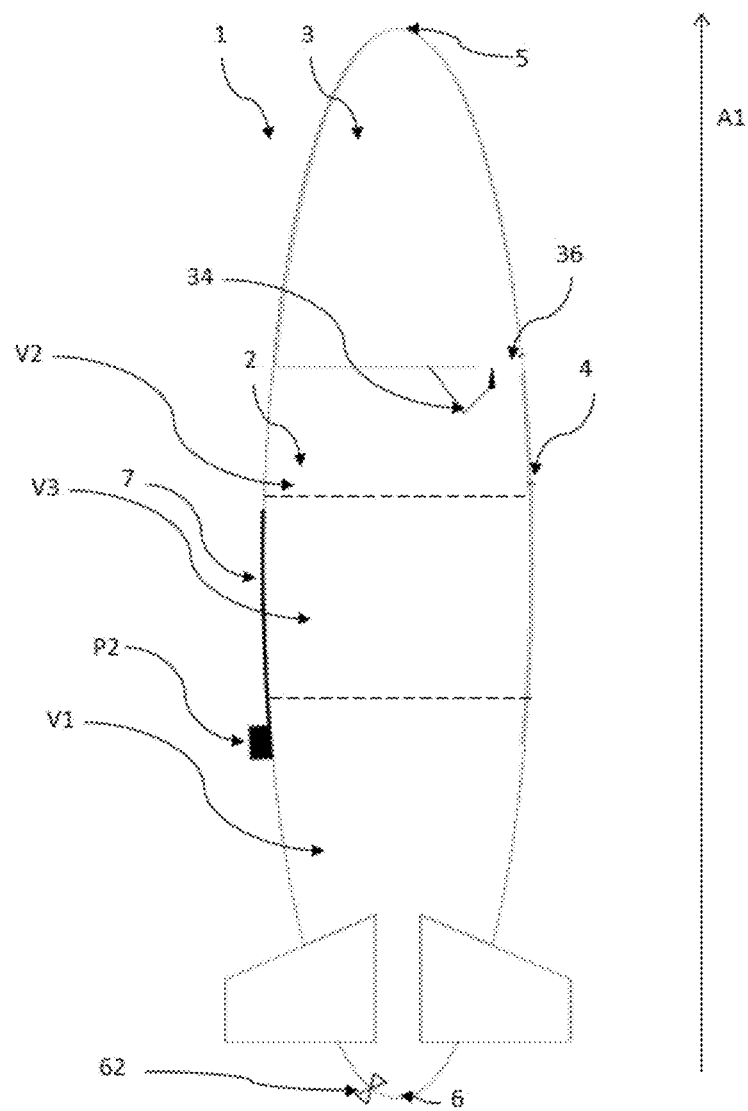
FIG. 3 represents a schematic view of the variable lift device according to the invention during an advanced ascending phase.

The reduction of the volume of air contained in the airtight enclosure 2 in parallel with the increase in the volume of the first airtight ballonet 3 continues until the opening of the first airtight ballonet 3 as represented in FIG. 3. The size of the first airtight ballonet 3 is chosen for its opening to occur after the most turbulent ascending phases. The opening of the first airtight ballonet 3 can therefore for example occur at half the ascension, or even when the pressure outside has been divided by 3 with respect to the pressure on the ground, or even when the variable lift device 1 has passed through most of the turbulences. Advantageously, the first airtight ballonet 3 is a ballonet that is interchangeable, once the variable lift device 1 is on the ground, that is to say that the first airtight ballonet 3 can be replaced when it is open by another airtight ballonet. The same does not apply to the second airtight ballonet 4 which is a permanent airtight ballonet.

In fact, the first airtight ballonet 3 comprises a perforation means 34 for perforating the first airtight ballonet 3 allowing the first airtight ballonet 3 to be opened and to release the lift gas into the airtight enclosure 2. Preferentially, the perforation means 34 for perforating the first airtight ballonet 3 can be the internal pressure generated by the expansion of the lift gas contained in the first airtight ballonet 3. Since the internal pressure generated by the expansion of the lift gas continually increases, the elastic limit of the first airtight ballonet 3 is reached and an opening 36 of the first airtight ballonet 3 can be observed. The perforation means 34 for perforating the first airtight ballonet 3 can be a mechanical device actuated using a controller such as, for example, a device comprising a needle or a keen blade.

The volume contained in the airtight enclosure 2 is then no longer filled only with air but is separated into three volumes. A first volume V1 represents the volume of air still contained in the airtight enclosure 2. Since air has a density greater than the density of the lift gas, this first volume V1 is positioned at the lowest point along the longitudinal axis A1 in the airtight enclosure 2, at the stern 6. Advantageously, since the discharge valve 62 is disposed against the stern 6 of the airtight enclosure 2, the first volume V1 of air can be expelled as the variable lift device 1 ascends. A second volume V2 represents the volume of lift gas released from the first airtight ballonet 3 by the opening 34. In fact, although the second airtight ballonet 3 is open, the lift gas contained continues to expand. The second volume V2 therefore increases as the variable lift device 1 ascends, thus acting on the first volume V1 of air which has to be expelled by the discharge valve 62. Since the lift gas has a density lower than the density of air, the second volume V2 is naturally positioned at the bow 5, where the second airtight ballonet 3 initially contained the lift gas. Finally, a third volume V3 is inserted between the first volume V1 of air and the second volume V2 of lift gas. This third volume represents a mix of the lift gas released from the first airtight ballonet 3 and the air initially contained in the airtight enclosure 2.

Throughout the ascension of the variable lift device 1, the second volume V2 of the lift gas increases following the expansion of the lift gas while the first volume V1 decreases following the expulsion of the air contained in the first volume V1 by the discharge valve 62.

Figure 5:
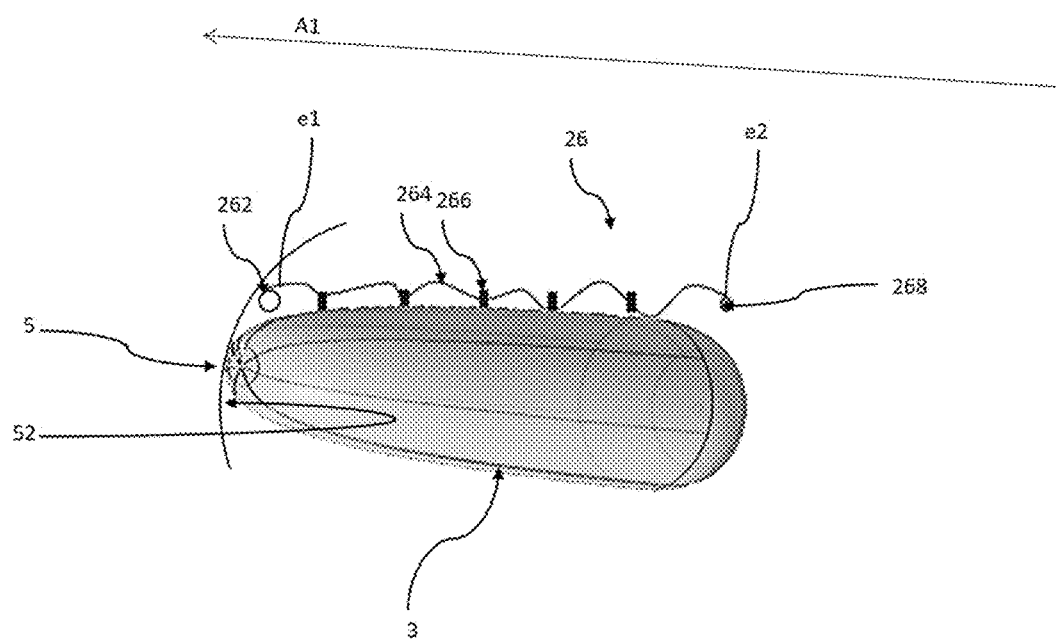
FIG. 5 represents a schematic view of the retraction device for the first airtight ballonet inside the variable lift device according to the invention.

Furthermore, in another embodiment of the invention, the airtight enclosure 2 comprises a retraction device 26 for the first airtight ballonet 3 represented in FIG. 5. The retraction device 26 allows the open first airtight ballonet 3 to attach against the inner face 52 of the bow 5 of the airtight enclosure 2. In this way, the first airtight ballonet 3 is fixed against the inner face 52 of the bow 5 and is not displaced in the airtight enclosure 2, which can present a risk for the manoeuvrability of the variable lift device 1. Furthermore, the retraction of the first airtight ballonet 3 against the inner face 52 of the bow 5 allows all the lift gas initially contained in the first airtight ballonet 3 to be released into the airtight enclosure 2.

The vertical ascension, as represented in FIG. 3, continues until the first volume V1 and the third volume V3 are totally expelled, that is to say when the airtight enclosure 2 contains only the expanded lift gas. When the airtight enclosure 2 contains only the second volume V2 of lift gas, the centre of mass of the variable lift device 1 is re-centred and the variable lift device 1 then switches from the vertical position represented in FIG. 3 to the horizontal position represented in FIG. 1.

In order to facilitate this counter-clockwise rotation of the variable lift device 1, the additional inclination device 7 switches from the retracted position P2, represented in FIG. 3, to the position of balance P1 represented in FIG. 1. In this way, the overall centre of mass of the variable lift device 1 returns to its position of balance and the variable lift device 1 switches back to the horizontal plane.

The use of the additional inclination device 7 is not obligatory for the variable lift device 1 to switch from the vertical position represented in FIG. 3 to the horizontal position represented in FIG. 1. In fact, the variable lift device 1, filled only with lift gas, will naturally revert to a position of balance on the horizontal plane. Nevertheless, the additional inclination device 7 can be considered as a safety measure ensuring the correct placement of the variable lift device 1 on the horizontal plane.

Figure 4:
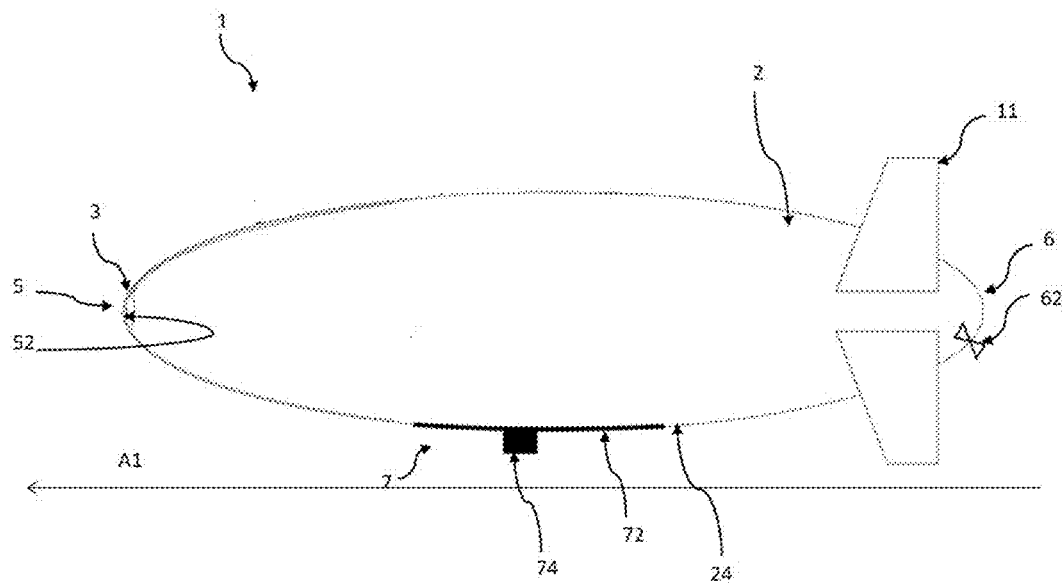
FIG. 4 represents a schematic view of the variable lift device according to a variant of the invention.

FIG. 4 represents a schematic view of the variable lift device 1 according to a variant of the invention. The variable lift device 1, according to the variant of the invention, comprises the pressurized airtight enclosure 2 accommodating the air and the first airtight ballonet 3 disposed inside the airtight enclosure 2 accommodating the pressurized gas with a density lower than the density of air, or lift gas. As stated previously, the first airtight ballonet 3 is obtained from an elastic material such as a type of plastic or other elastomer and comprises a perforation means 34 for perforating the first airtight ballonet 3.

As stated previously, the variable lift device 1 comprises the discharge valve 62, placed at the stern 6 allowing the air contained inside the airtight enclosure 2 to be expelled to the environment outside the variable lift device 1 and the additional inclination device 7 placed against an inner surface 24 of the airtight enclosure 2 outside the variable lift device 1.

Unlike the invention presented in FIG. 2, during the phase preceding the take-off of the variable lift device 1, the airtight ballonet 3 is initially filled with the lift gas. Thus, when the take-off takes place and ascension begins, the lift gas is already contained in the first airtight ballonet 3 and the variable lift device 1 is placed more rapidly in the vertical position.

However, the switch from the horizontal position to the vertical position, during the take-off of the variable lift device 1, must be controlled in order not to damage or even destroy tail units 11 of the variable lift device 1 against the ground.

When the take-off takes place and ascension begins, the variable lift device 1 is placed vertically. The lift gas then expands and increases the volume of the first airtight ballonet 3.

As stated previously, the increase in the volume of the first airtight ballonet 3 means a reduction of the volume of air contained inside the airtight enclosure 2 which is reflected by an expulsion of the air by the discharge valve 62 to the outside environment.

In vertical position, the bow 5 then points in a direction of ascension which is the direction of rise of the variable lift device 1, whereas the stern 6 points in the opposite direction, that is to say towards the ground.

The reduction of the volume of air contained in the airtight enclosure 2 in parallel with the increase in the volume of the first airtight ballonet 3 continues until the opening of the first airtight ballonet 3. The opening of the first airtight ballonet 3 in the airtight enclosure 2 is done when the variable lift device 1 reaches an altitude deemed close to the final altitude of the variable lift device 1.

The volume contained in the airtight enclosure 2 is then no longer filled only with air but is separated into three volumes. As stated previously, the airtight enclosure 2 then contains the first volume V1 representing the volume of air still contained in the airtight enclosure 2, the second volume V2 representing the volume of lift gas released from the first airtight ballonet 3 and the third volume V3 is inserted between the first volume V1 of air and the second volume V2 of lift gas representing the mix of the lift gas released from the first airtight ballonet 3 and the air initially contained in the airtight enclosure 2. The second volume V2 then increases as the variable lift device 1 ascends, thus acting on the first volume V1 of air which has to be expelled by the discharge valve 62.

The airtight enclosure 2 also comprises the retraction device 26 for the first airtight ballonet 3. The retraction device 26 allows the open first airtight ballonet 3 to attach against the inner face 52 of the bow 5 of the airtight enclosure 2. In that way, the first airtight ballonet 3 is fixed against the inner face 52 of the bow 5 and is not displaced in the airtight enclosure 2.

FIG. 5 represents a schematic view of the retraction device 26 for the first airtight ballonet 3 inside the variable lift device 1 according to the invention. The retraction device 26 for the first airtight ballonet 3 comprises a winder 262 in direct contact with the inner face 52 of the bow 5 of the airtight enclosure 2, a wired link 264 of which a first end e1 is in contact with the winder 262, and a stop device 268 is placed at a second end e2. Passage interfaces 266 are placed and aligned along the horizontal axis A1 against the first airtight ballonet 3 so that the wired link 264 passes through each of the passage interfaces 266. When the first airtight ballonet 3 is open and the lift gas escapes therefrom, the winder 262 is activated and winds up the wired link 264. The wired link 264 is therefore pulled towards the winder 262, just like the stop device 268. The dimension of the stop device 268 is greater than the orifice of the passage interfaces 266. In other words, the passage interfaces 266 are configured to allow the wired link 264 to slide through and to block the stop device 268. The passage interfaces 266, not allowing the passage of the stop device 268, are then pulled one-by-one, following the action of the stop device 268, which is itself drawn by the winder 262, towards the winder 262. When the stop device 268 is in contact with the winder 262, the winder 262 stops drawing the wired link 264 and the first airtight ballonet 3 is retracted against the inner face 52 of the bow 5.

The invention claimed is:

1. A variable lift device, comprising:
    a pressurized airtight enclosure accommodating air,
    a first airtight ballonet disposed inside the airtight enclosure accommodating a pressurized gas with a density lower than the density of air, wherein the first airtight ballonet is configured to release only when perforated the gas with a density lower than the density of air into the airtight enclosure accommodating the air, such that said gas mixes with the air inside the airtight enclosure accommodating the air.

2. The variable lift device according to claim 1, the airtight enclosure comprising a stern, wherein at least one discharge valve is disposed against the stern of the airtight enclosure.

3. The variable lift device according to claim 1, wherein the first airtight ballonet is produced from a plastic material.

4. The variable lift device according to claim 1, wherein the first airtight ballonet is interchangeable with respect to the variable lift device.

5. The variable lift device according to claim 1, wherein the first airtight ballonet is perforated when an elastic limit of the first airtight ballonet is exceeded.

6. The variable lift device according to claim 1, wherein the variable lift device comprises a second airtight ballonet disposed inside the airtight enclosure and fluidically connected to the first airtight ballonet.

7. The variable lift device according to claim 6, the airtight enclosure comprising a top surface, wherein the second airtight ballonet is disposed against the top surface of the airtight enclosure.

8. The variable lift device according to claim 1, the airtight enclosure comprising a bow, wherein the first airtight ballonet is disposed against an inner face of the bow of the airtight enclosure.

9. The variable lift device according to claim 8, the airtight enclosure comprising a retraction device for the first airtight ballonet, wherein the retraction device for the first airtight ballonet comprises a winder in direct contact with the inner face of the bow of the airtight enclosure, the retraction device for the first airtight ballonet comprises a wired link of which a first end e1 is in contact with the winder, and a second end e2 is in contact with the first airtight ballonet.

10. The variable lift device according to claim 1, extending along a first longitudinal axis A1, comprising an additional inclination device disposed against the variable lift device.

11. The variable lift device according to claim 10, wherein the additional inclination device has a transverse mobility along the longitudinal axis A1 from a position of balance P1 to a retracted position P2.

12. The variable lift device according to claim 1, wherein the first airtight ballonet is perforated using a mechanical device actuated by a controller.

13. The variable lift device according to claim 12, wherein the mechanical device is a needle.

14. The variable lift device according to claim 12, wherein the mechanical device is a keen blade.

\* \* \* \* \*